UNITED STATES PATENT OFFICE.

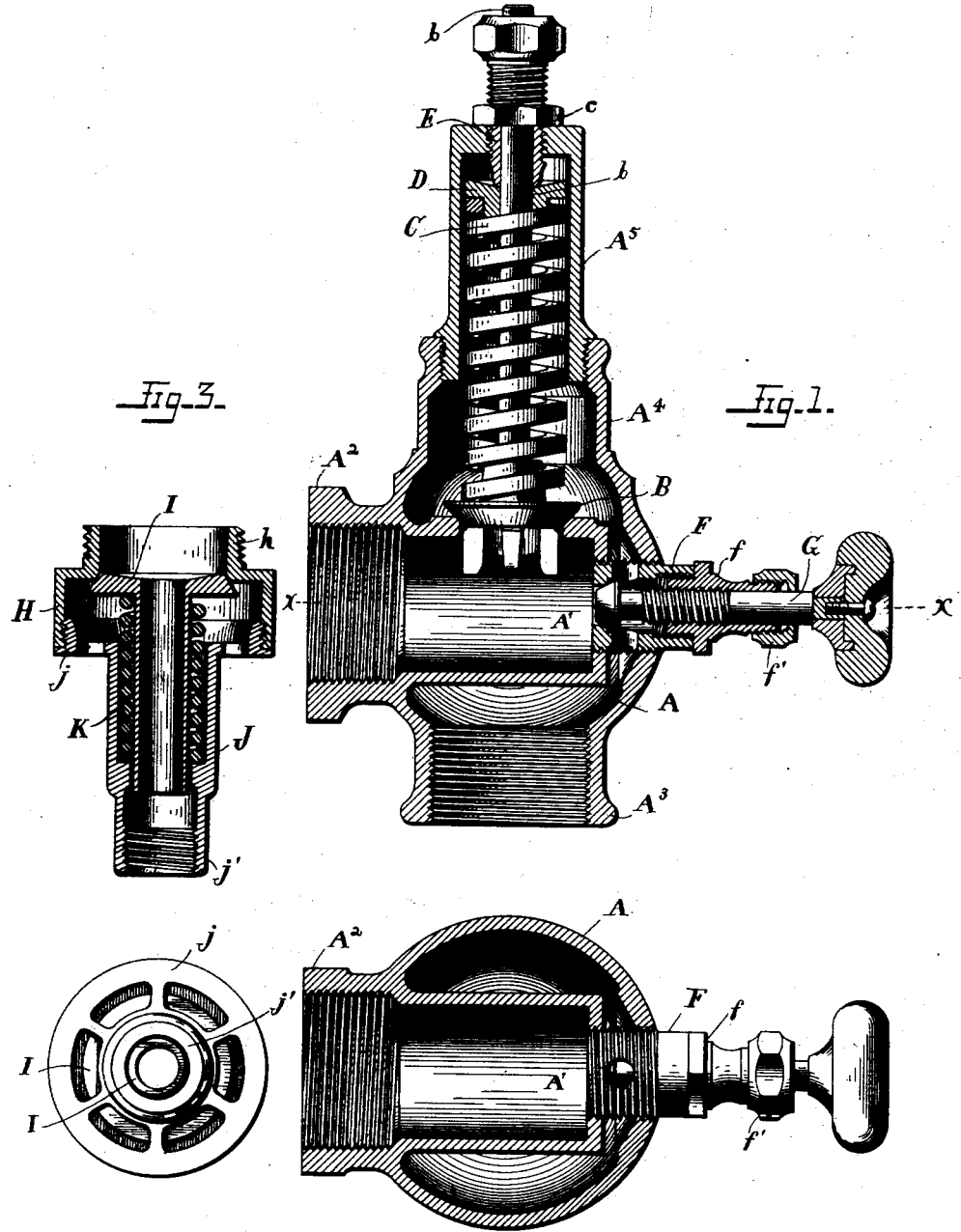

FRANK SCHREIDT, OF MANSFIELD, OHIO.

AUTOMATIC RELIEF-VALVE.

SPECIFICATION forming part of Letters Patent No. 525,629, dated September 4, 1894.

Application filed August 5, 1893. Serial No. 482,422. (No model.)

*To all whom it may concern:*

Be it known that I, FRANK SCHREIDT, a citizen of the United States, and a resident of Mansfield, in the county of Richland and State of Ohio, have invented certain new and useful Improvements in Automatic Relief-Valves, of which the following is a specification.

This invention relates to relief valves for engine cylinders. Its object is to provide a compact, durable and efficient device which involves but little labor to construct, and on account of its simple construction, is not liable to get out of order.

The invention consists in the peculiar combination and arrangement of the parts illustrated in the accompanying drawings, in connection with which the invention will be first fully described and then particularly referred to and pointed out in the claims.

Referring to the drawings, in which like parts are represented by similar reference letters wherever they occur throughout the various views, Figure 1 is a longitudinal vertical section of my improved valve. Fig. 2 is a transverse section taken through line $x\ x$ of Fig. 1, but with some of the parts shown in elevation. Fig. 3 is a diametrical section of the union and relief attachment for coupling the waste pipe and valve case. Fig. 4 is a detailed plan view of the pipe coupling or lower portion of the union.

The valve case A has formed integral with it four branches, $A'$, $A^2$, $A^3$, and $A^4$. The inward tubular branch $A'$ is flattened upon the top and perforated to furnish a seat for the main relief valve B. The branch $A^2$, which is a continuation of the interior branch $A'$, is interiorly screw threaded to be coupled to the union and connected to the engine cylinder. The downwardly projecting branch $A^3$ is also screw threaded interiorly to receive the union which contains the auxiliary relief valve, as shown in Fig. 3. The upwardly projecting branch $A^4$ receives the tube $A^5$, which contains the stem $b$ of the spring loaded valve B, the spring C, the follower D and the tubular nipple E for adjusting the tension of the spring.

The globular part of the case opposite the branch $A^2$ is perforated and screw threaded, as is also the end of the branch $A'$, to receive the tube F the interior end of which is turned off to form a seat for the hand valve G. The stem of the valve is screw threaded into a flanged thimble $f$, which is screwed into the tube F, the end of the tube $f$ being provided with a hollow packing nut $f'$. The tube F is also perforated at its inner end to allow the escape of steam or water from the cylinder through into the valve case A and from there to the escape branch $A^3$.

In my relief valves heretofore used the waste pipe has been directly connected to the discharge branch, as $A^3$ of the valve case, and it is necessary that the discharge should be large, for at times the accumulation of water in the cylinder is so great that it must be suddenly discharged to prevent blowing out the cylinder head or injuring the engine, but ordinarily a much smaller discharge orifice is sufficient, and the large pipe carried from the discharge branch $A^3$ is frequently inconvenient and much in the way. I have therefore provided what I term the auxiliary relief valve, shown in Figs. 3 and 4, which enables a sufficient discharge for all occasions and allows me to use the smaller discharge pipe.

Referring now to Fig. 3, I will describe the auxiliary relief valve and pipe union.

H is a cylindrical case and has the threaded neck $h$ to couple into the discharge branch $A^3$. The interior of the neck is turned true to form a seat for the spring pressed valve I, the stem of which is tubular. The branch union J has an annular flange $j$ which screws into the chamber H. The neck of the branch J has an offset or shoulder between which and the valve I is compressed the coiled spring K, which forces the valve I and holds it normally to its seat. The bottom or web portion of the flange $j$ is perforated, as clearly shown in Fig. 3, the perforations opening to the air around the neck of the coupling J. The lower end of the neck $j'$ is tapped to receive the waste pipe which may be quite small. The pressure of the spring C upon the valve B may be regulated to any degree desired by loosening the nut $e$ and adjusting the tube E to tighten or slacken the spring. The tension is held by again tightening down the nut $e$. Now it will be seen that any unusual accumulation of water in the cylinder will force up the valve B and discharge the water through the waste pipe or branch A³. Should, from any cause, more water accumulate in the valve case A than could be carried off through the tubular stem of the valve I, the valve I would be forced down by the pressure and the water discharged through the perforations in the flange j. If, for any reason, it is desired to relieve the cylinder, the hand valve G may be opened whenever desired, and the valves and its connections may be removed if desirable to place an indicator upon the tube F for the purpose of testing the proper working of the engine.

What I claim is—

1. The combination of the valve case, the induction branch extending within it, the inner extension having a valve seat a hand valve to close and open said seat, the upwardly extending branch, a spring loaded valve within it, said valve seating upon the inner induction branch, and an eduction branch to connect to the waste or bilge pipe, substantially as shown and described.

2. The combination of the valve case A, having branches A', A², A³, and A⁴ formed integral therewith, the tube A⁵ forming an upward extension of the branch A⁴, the valve B having stem b within the tube A⁵, and the spring to hold the valve normally to its seat, substantially as shown and described.

3. The combination of the valve case having lateral induction branches extending outwardly and inwardly therefrom, the interior branch having a valve seat, the upwardly extending branch, the spring loaded valve resting normally upon said seat and having its stem extending through the said upwardly extending branch, the tube F passing through the case, communicating with the inner end of the induction branch, and provided internally with a valve seat, the hand valve to close or open the port in the inner end of said tube F, and the discharge branch A³ arranged to operate substantially as set forth.

4. The combination, in a cylinder relief valve, of the valve case, the spring pressed valve therein, the cylindrical case H having a reduced neck to couple with the discharge branch of the main valve case and provided with a valve seat, the upwardly closing spring pressed valve I having a hollow stem, the coupling union J incasing the hollow stem and having perforated flange j secured in the lower end of the case H, substantially as shown and described.

5. The automatic relief valve having a discharge branch as A³, in combination with the auxiliary relief valve consisting of case H, spring pressed valve I having a hollow stem, and the union J having perforated flange j, and the spring K coiled around said stem within the union J to hold said valve normally to its seat, substantially as and for the purpose set forth.

FRANK SCHREIDT.

Witnesses:
E. T. COOKE,
L. P. BENNETT.